March 26, 1929.  M. LOUGHEAD ET AL  1,707,063
PRESSURE MECHANISM FOR BRAKING SYSTEMS
Filed Nov. 12, 1926
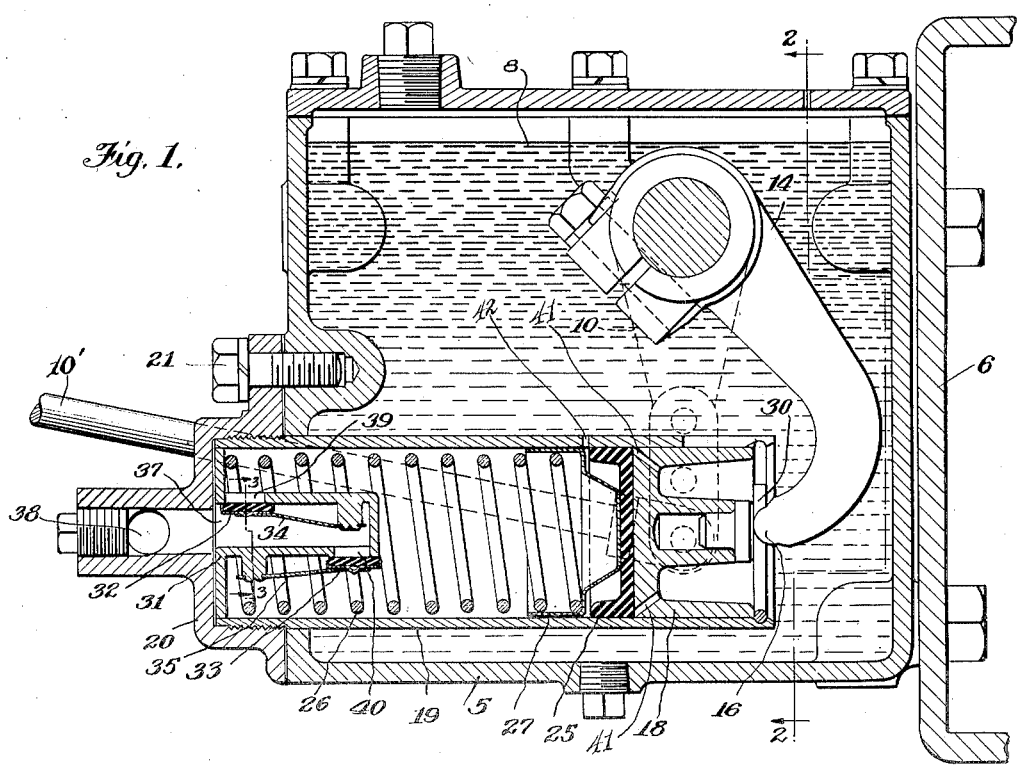
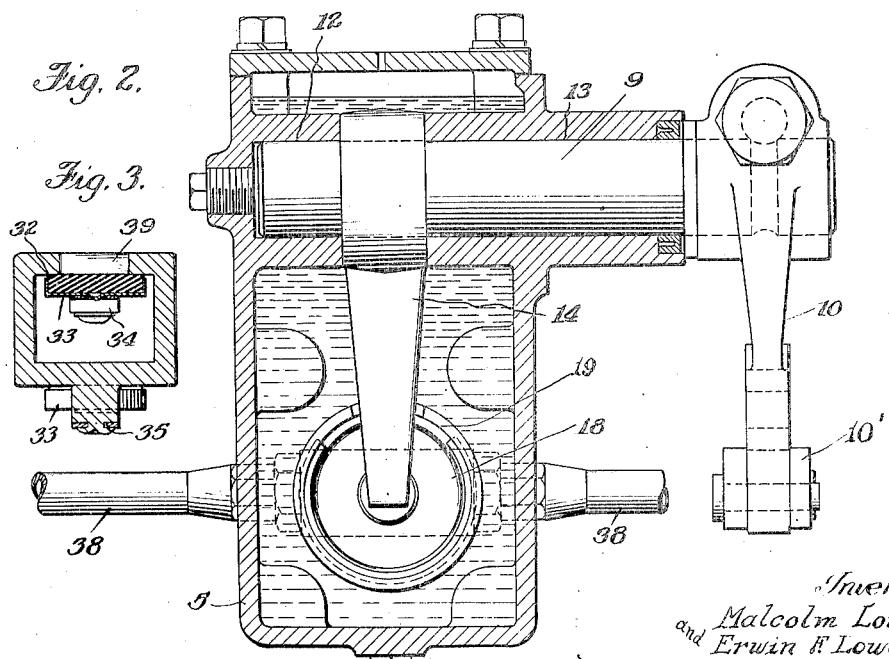
Inventors
Malcolm Loughead
and Erwin F. Loweke
By Williams, Bradbury, McCaleb & Hinkle
Attys.

Patented Mar. 26, 1929.

1,707,063

UNITED STATES PATENT OFFICE.

MALCOLM LOUGHEAD AND ERWIN F. LOWEKE, OF DETROIT, MICHIGAN, ASSIGNORS TO HYDRAULIC BRAKE COMPANY, OF DETROIT, MICHIGAN, A CORPORATION OF CALIFORNIA.

PRESSURE MECHANISM FOR BRAKING SYSTEMS.

Application filed November 12, 1926. Serial No. 147,859.

This invention relates to the fluid supply means for a fluid operated brake system using a substantially non-compressible liquid as the fluid.

It is an object of this invention to provide simple means for maintaining the system full of liquid, for continuously replenishing the losses which occur from leakage, and to take care of the expansion and contraction of the liquid due to temperature changes.

Another object of the invention is to maintain the piping and wheel cylinders under a slight continuous pressure as a positive assurance against negative pressures which might admit air to the system around the cup washers in the wheel cylinders.

For reference to the details of the parts of our system other than the pressure producing and maintaining mechanism, reference may be had to the co-pending application of Malcolm Loughead, Serial No. 115,750 filed June 14, 1926, in which a complete braking system including the piping and the wheel cylinder mechanism is disclosed.

Our invention is illustrated in the accompanying drawing in which,

Figure 1 is a vertical section through the reservoir and operating cylinder of our pressure producing mechanism;

Figure 2 is a vertical section through the apparatus taken on the line 2—2 of Figure 1; and Figure 3 is an enlarged section taken on the line 3—3 of Figure 1.

Referring to the drawings, the housing 5 is suitably attached to an automobile cross frame member 6 and constitutes a reservoir which under initial conditions stands partially full of liquid to about the level as indicated at 8. An operating shaft 9 carrying an external lever 10 to which a link 10' may be attached extending to the foot brake pedal of an automobile is journaled at 12 and 13. A lever 14 is secured to the shaft 9 within the housing 5 and has a portion 16 serving to transfer the rotary motion of the shaft 9 to the piston 18 operating within the cylinder 19.

The cylinder 19 is suitably mounted upon the head 20 which is attached to the body 5 by means of four bolts such as 21. Leakage past the piston 18 is prevented by a rubber cup washer 25 which is held against the piston 18 by means of a spring 26 and metallic cup 27, the pressure of the spring 26 being light for the purpose to be hereinafter described.

Within a groove at the inner end of the cylinder 19 is a C-spring 30 against which the piston 18 normally abuts within the cylinder 19, and adjacent the head 20 is a valve housing 31 carrying valves 32 and 33. These valves are in the form of rubber discs and are spring pressed against their seats by means of springs 34 and 35. The housing 31 is preferably made of die-casting metal and is provided with a main discharge opening 37 which connects with the pipe lines 38 extending to the wheel cylinders and with the valve controlled openings 39 and 40. The spring 34 holds its valve 32 very lightly against its seat so that the pressure required to force fluid from the interior of the cylinder through the port 39 and out to the pipe 38 is very slight. The spring 35, however, is given a sufficient set so that the valve 33 is held against its seat with such a normal force as to require a pressure of about ten pounds per square inch to force liquid from the interior of the valve housing through the opening 40 into the cylinder 19.

The positive piston return spring 26 is preferably so light that acting alone it will not build up a fluid pressure, or rather suction, over the area of the piston greater than the ten pound fluid pressure for which the check valve 33 is loaded. But regardless of the absolute pressure of the spring 26, its strength and the flexibility of the rubber cup washer 25 are such that before the suction created in the cylinder 19 becomes great enough to unseat the valve 33 against a zero back pressure, the cup washer 25 will yield to let the fluid slip past it from the reservoir of the case 5 into the interior of the cylinder by way of obliquely arranged ducts 41. The effect of this arrangement is that if the return springs for the brake cylinders fail to function quickly the piston 18 will be urged to its normal position but instead of creating a negative pressure in the fluid lines or wheel cylinders, the suction will be relieved wholly from the reservoir. Similarly, if the return springs at the wheel cylinders build up a pressure of say, ten pounds in the lines, the suction in the master cylinder 19 will be relieved partly through the valve 33 and partly past the cup washer 25, still maintaining a slight positive pressure in the wheel cylinders and pressure lines. In ordinary operations, however, the return springs at the wheel cylinders act forcibly and quickly enough to overbalance the check valve 33 and replace fluid into the master cylinder so that very little, if any, fluid slips past the cup washer 25.

As a further assurance that the system will be fully replenished at the completion of each application of the brakes, a port 42 is drilled through the top wall of the cylinder 19 to communicate with the cylinder just within the feather edge of the cup washer 25 when the piston is returned to its normal position as defined by the C-spring 30. An additional function of the port 42 is to permit the egress of fluid from the cylinder 19. In case the wheel cylinders were sluggish in returning the previously displaced fluid to the cylinder and the suction caused by the piston return spring 26 was relieved by the fluid slipping past the cup washer 25 or drawn in through the port 42, the result would be that, when the previously displaced fluid was finally returned from the cylinders, there would be too much fluid in the system. The port 42 will then permit the excess to be returned to the reservoir. In a somewhat similar way the port 42 will also return to the reservoir any excess in the volume of liquid in the cylinder which might develop for other reasons, such as expansion due to temperature variations.

Conversely the compressor will replenish the system to compensate for volumetric insufficiencies in the system which may be due to leakage, decreases in temperature, etc. This replenishing feature of the compressor is of particular importance in the admission of fluid into the fluid system to lengthen the effective fluid column between the compressor and wheel cylinder pistons to compensate for the gradually progressing retractile position of the wheel cylinder pistons, especially where an automatic take-up mechanism is employed to progress the retractile movement of the shoes and of the wheel cylinder pistons.

The fluid brake apparatus here described thus guards the liquid or non-compressible fluid system against the ingress of a compressible fluid—air—by maintaining the pressure lines and the wheel cylinders under a slight positive pressure, and by immersing the master cylinder in a reservoir of the liquid medium to provide a liquid seal for the cylinders where it might otherwise suck in air. The apparatus shown also, as previously pointed out, automatically maintains the liquid system at its correct volume and compensates for both increases and decreases in the required liquid volume.

Attention is also directed to the obvious advantages of the structural features of the design of compressor illustrated in the drawings. The cylinder assembly is readily detachable from the casing without removing the casing from its support or disconnecting the linkage to the brake pedal. The cylinder itself may be formed from stock tubing, and the check valve assembly readily lends itself to quantity production.

While but this one specific embodiment of the present invention is illustrated in this specification, it is contemplated that many changes may be made without departing from the scope or spirit of the invention.

We claim:

1. A compressor for a hydraulically actuated braking system comprising an open topped casing constituting a reservoir for the liquid medium, a top closure therefor, a head removably mounted in an end wall of the casing, a cylinder supported in the head and extending into the interior of the reservoir adjacent its bottom, a piston slidable in the cylinder, means within and without the casing for actuating the piston, and discharge and inlet check valves supported by the head and disposed within the adjacent end of the cylinder.

2. In a hydraulic braking system a compressor comprising a liquid reservoir, a cylinder, a piston therefor exposed at its rearward face to the liquid in the reservoir, piston operating mechanism within and without the reservoir having only abutting connection with the piston enabling said piston-operating mechanism to move said piston only in its compression direction, spring means for retracting the piston, and means affording liquid communication from the interior of the cylinder to the reservoir when the piston is retracted.

3. A compressor for a hydraulically actuated braking system comprising a casing forming a liquid reservoir, a master cylinder submerged therein, a piston therefor, a piston operating arm pivoted within the casing and abutting said piston for operating the latter in one direction only and having freedom of movement whereby said arm may be moved away from the piston without drawing the piston in the reverse direction, and pedal actuated means without the casing for operating the arm and other means for returning the piston to normal position.

4. A compressor for a hydraulically actuated braking system comprising a casing forming a liquid reservoir, a master cylinder submerged therein, a piston therefor, a piston operating arm pivoted within the casing above the top of the bore of the cylinder and abutting the piston for operating the same in one direction only, and pedal actuated means without the casing for operating the arm and other means for returning the piston to normal position.

In witness whereof, we hereunto subscribe our names this 10th day of August, 1926.

MALCOLM LOUGHEAD.
ERWIN F. LOWEKE.